July 5, 1966   R. J. DEISENROTH ETAL   3,258,876
WINDOW SASH PLASTIC WEATHERSTRIP
Filed Dec. 30, 1963   2 Sheets-Sheet 2

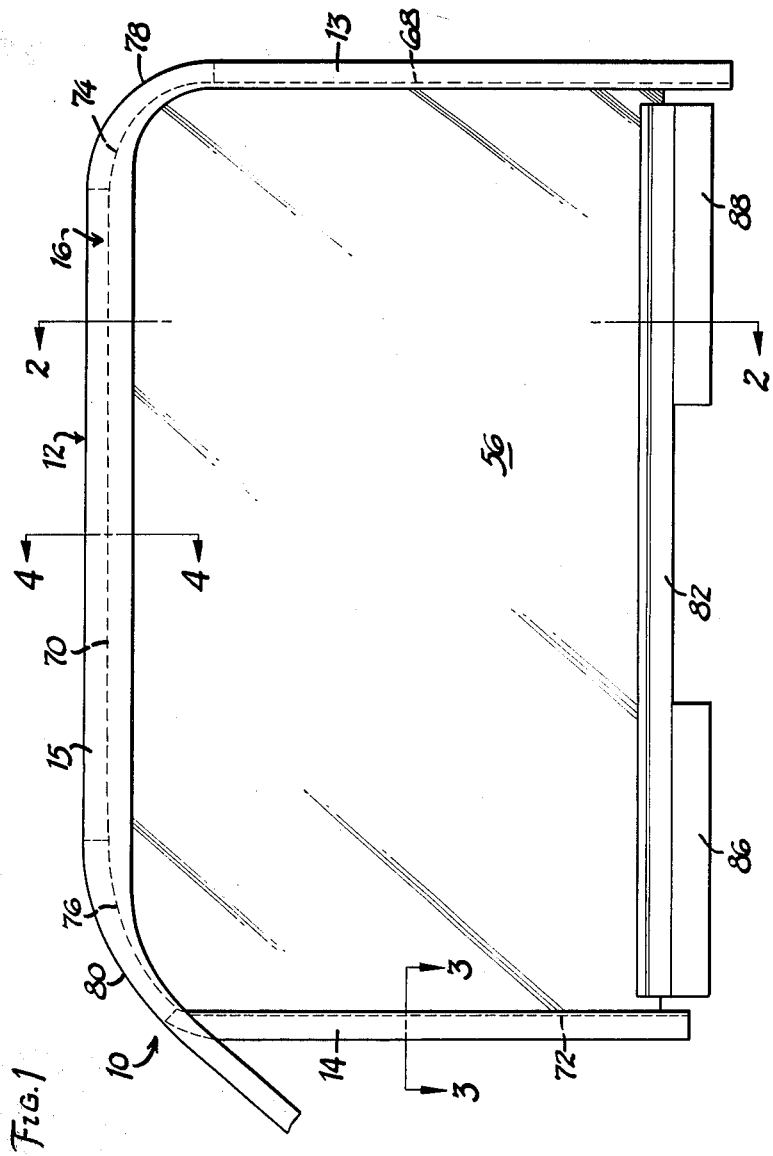

INVENTORS
ROBERT J. DEISENROTH
BY CARL E. SIGSBEE
WILSON, SETTLE & CRAIG
ATTORNEYS

United States Patent Office 3,258,876
Patented July 5, 1966

3,258,876
WINDOW SASH PLASTIC WEATHERSTRIP
Robert J. Deisenroth and Carl E. Sigsbee, Elkhart, Ind., assignors to Excel Corporation, Elkhart, Ind., a corporation of Indiana
Filed Dec. 30, 1963, Ser. No. 334,185
13 Claims. (Cl. 49—441)

This invention relates to a plastic weatherstrip for a sliding window which will effectively compensate for dimensional variations in window pane thickness, sash and frame misalignment, variations in sash and frame member dimensions and window curvature.

The weatherstrip of the present invention is particularly useful as a weatherstrip for sliding windows such as those provided in automobiles, buses, aircraft and like vehicles. It is particularly adapted for use in connection with automobile sliding windows having a curved configuration.

In the past, weatherstrips have been principally fabricated from materials such as wool or synthetic organic filament pile, cloth, felt, flocked rubber and various rubberized fabrics. The use of plastic for weatherstrips has long been desired because of the desirable properties of plastic, such as durability, cost, adaption to mass production technique and imperviousness to moisture and gases. However, whenever it has been attemped to use plastic for weatherstrips, difficulties have been encountered in obtaining a satisfactory seal between the plastic and the member which is contacted and also in the obtaining of smooth, relatively frictionless sliding action between the plastic and a sliding member.

A particularly difficult weatherstrip problem has recently been encountered in the automotive field. Curved side windows have recently been incorporated into some models of automobiles. This has posed a problem in addition to the usual problem of varying window dimensions. When a window pane is curved it must, of course, move in a path which conforms to the curve. This curved path accentuates the problems of dimension variations and results in considerable rubbing of the window pane against the weatherstrip. Initially, when the weatherstrip snugly fits the window pane, considerable friction is encountered resulting in stiff operation of the window mechanism. However, the conventional fabric, wool pile or felt weatherstrip soon wear as a result of continual rubbing of the window pane thereagainst. As soon as the conventional weatherstrip has worn, the windows begin to rattle and the seal between the window and the weatherstrip is deteriorated to a point where weather, such as rain or air, enters the vehicle.

The present invention solves this problem by providing a weatherstrip fabricated of plastic having one floating channel portion which engages the window pane and is flexible to compensate for variations in window pane thickness and also for the curved path of the window. The weatherstrip has a second portion for engagement with the window frame, the second portion not being affected by the action of the first portion.

It is, therefore, an object of the invention to provide a plastic weatherstrip for a sliding window.

Another object of the invention is to provide a plastic weatherstrip having a first portion for engagement with the window pane to form a weather-tight flexible weatherstrip for the pane.

Another object of the invention is to provide such a weatherstrip having a second portion for engagement with the window frame.

An additional object of the invention is to provide a weatherstrip in which the second portion is independent in operation from the first portion, the second portion being capable of compensating for variations in window frame dimensions and window frame misalignment and the first portion being capable of compensating for variations in window pane thickness and variations in the path of the sash.

Other objects of this invention will appear in the following description and appended claims, reference being had to the accompanying drawings forming a part of this specification wherein like reference characters designate corresponding parts in the several views.

In the drawings:

FIGURE 1 is a side elevational view of a vehicle window incorporating a weatherstrip in accordance with one embodiment of the invention;

Figure 4:
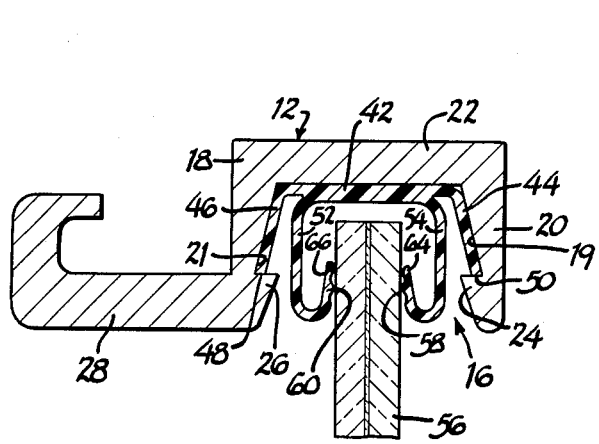
FIGURE 4 is a sectional view taken substantially along the line 4—4 of FIGURE 1 looking in the direction of the arrows.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

A window structure 10 incorporating the weatherstrip of the present invention is illustrated in FIGURE 1. The window construction 10 is of the type employed in automobile manufacture. The window structure 10 comprises a frame forming part of the front side door of an automobile. The frame includes an extruded L-shaped aluminum frame member 12 having one leg 13 which forms the frame rear or aft end and a second leg 15 which forms the upper portion of the frame. A ventilator division bar 14 extends downwardly from the forward portion of the leg 15 to complete U-shaped frame structure which, as will be appreciated, extends upwardly from the vehicle door (not shown).

Figure 3:
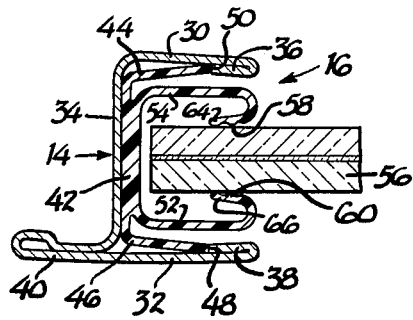
FIGURE 3 is a sectional view taken substantially along the line 3—3 of FIGURE 1 looking in the direction of the arrows.

As will be noted in FIGURES 3 and 4, each of the frame members 12, 14 has a generally channel-shaped configuration to receive the weatherstrip 16. Referring to FIGURE 4, it will be noted that the frame member 12 has side walls 18, 20 joined together by a web portion 22 to form the desired channel. The inner surfaces 19, 21 of the side walls slant outwardly. Each side wall 18, 20 has an inwardly extending lip portion 24, 26 at the outer edge thereof forming stops to retain the weatherstrip 16 in place. A conventional weatherstrip retainer 28 extends sidewardly from the side wall 18.

The ventilator division bar 14 shown in FIGURE 3 is rolled from a strip of metal to form side walls 30, 32 connected by web 34. The outer edge of each side wall 30, 32 is rolled back towards the web 34 to form stops or shoulders 36, 38 for retaining the weatherstrip in place. Forwardly extending portion 40 is formed on the bar 14 for weatherstrip mounting in connection with the vehicle vent window (not shown).

The weatherstrip 16 is a continuous strip fabricated from an organic polymeric material. The plastic should have such physical properties as impermeability to moisture and air, toughness, stability and a low coefficient of friction. The material should be flexible, not brittle, as it must be able to yield under pressure and return to its original shape upon the release of pressure. The preferred organic polymeric material is polypropylene.

Additives, such as pigment and fillers as commonly used in the plastic art may be employed with the plastic material. A lubricant may be impregnated into the outer surface of the plastic material to reduce its coefficient of friction.

The continuous strip may be formed by any well known extrusion process. In extruding the strip, it is desirable to keep the surface as smooth as possible in order to reduce the coefficient of friction and to prevent sticking and squeaking when in sliding contact with a contacting member. Curved weatherstrip portions are also provided for mounting in corners. Such curved portions are molded rather than extruded. The molding may be by any conventional process.

Referring to FIGURES 3 and 4, the cross-sectional configuration of the weatherstrip may be appreciated. The weatherstrip 16 comprises a web or bottom wall 42 having a pair of side walls 44, 46 extending angularly outwardly therefrom to form an outer channel. The side walls 44, 46 in the free state, are spaced farther apart than the side walls 18, 20 of the frame member 12 or the side walls 30, 32 of the ventilator division bar 14. Consequently, when the weatherstrip 16 is mounted in the frame member 12 or ventilator bar 14, the side walls 44, 46 are in pressure contact with the respective frame member side walls. This arrangement results in positioning the outer edges 48, 50 of the weatherstrip beneath and in abutting relationship with the lips 24, 26 of the frame member 12 and the shoulders 36, 38 of the ventilator bar 14 to thus retain the weatherstrip in place. A weather-tight seal is formed between the side walls 44, 46 and the inner surface of the frame walls.

An inner channel is provided within the outer channel defined by the weatherstrip side walls 44, 46. The inner channel comprises side walls 52, 54 which extend from the web portion 42. The inner channel is adapted to receive the window pane 56. The outer end portions 64, 66 of the side walls 52, 54 are reversely turned and angled towards each other for sealing engagement with the window pane 56. It will be noted that the free ends of the inwardly and outwardly angled resilient side walls are generally parallel to each other and extend in opposite directions. A plurality of spaced longitudinally extending ribs 58, 60 are provided on the opposing inner faces of the portions 64, 66. The rigs 58, 60 sealingly engage the window pane 56. One or more of the ribs may be in contact with the window pane depending upon the thickness of the pane. As will be appreciated, in commercial production, window glass may vary approximately plus or minus thirty thousandths of an inch. The portions 64, 66 are spaced a distance at their inner edges to result in sealing contact with a window pane having the minimum thickness as shown in FIGURES 3 and 4.

In the window construction 10 shown in FIGURE 1, the complete weatherstrip 16 is formed of five different sections. Elongated extruded sections 68, 70, 72 are snapped into the straight portions of the frame member 12 and ventilator division bar 14. Curved molded sections 74, 76 are snapped into the rounded corners 78, 80 of the frame to form the continuous weatherstrip 16.

Figure 2:
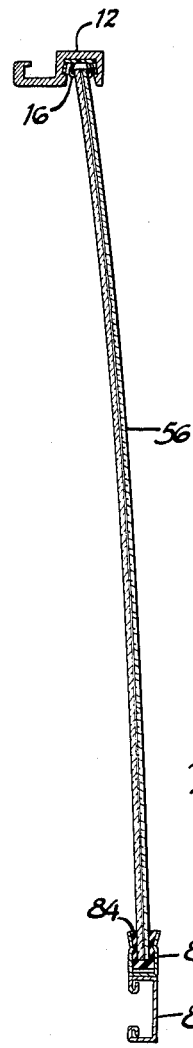
FIGURE 2 is a sectional view along the line 2—2 of FIGURE 1 looking in the direction of the arrows illustrating the curvature of the window pane.

As will be noted in FIGURE 2, the window pane 56 has a curved configuration, the curvature being a section of a circle having a large diameter. The lower edge of the window pane 56 is bedded into channel-shaped regulator rail 82 by means of resilient bedding material 84. The regulator rail 82 has regulator cams 86, 88 which cooperate with conventional actuating mechanism (not shown) for raising and lowering the sash.

As will be appreciated from the structure thus described, the outer weatherstrip side walls 44, 46 are free to engage the frame members 12, 14 without being inhibited by the inner side walls 52, 54. Conversely the inner side walls 52, 54 are independent of the outer walls. Thus, the inner walls 52, 54 may flex during window pane 56 movement in any direction which is required while always maintaining sealing contact with the window pane. The wall members 52, 54 may thus be considered to float. During movement of the window pane 56, the outer side walls 44, 46 are not subject to any substantial forces and thus remain in fixed engagement with the frame members. Further, each of the pair of inner side walls 52, 54 and outer side walls 44, 46 are free to compensate for the alignment and exact dimensions of, respectively, the frame members 12, 14 and window pane 56.

While the invention has been described for use with a curved automobile side window pane, it will be appreciated that the invention is also applicable to standard windows in which the window pane is flat and is mounted within a conventional sash frame and solid sliding doors, panels or gates mounted in weatherstrip frames. The advantages of the invention are equally applicable to such constructions.

Having thus described our invention, we claim:

1. A weatherstrip for a sliding window, said weatherstrip being fabricated from an organic polymeric material and having a cross-sectional contour comprising an outer channel and an inner channel, the outer channel having outwardly angled resilient side wall portions which are flexible for pressure contact with the interior wall surfaces of a window frame channel, the inner channel having inwardly angled side wall portions for substantially leak-free contact with a slidable window sash, the free ends of the inwardly and outwardly angled resilient side wall portions being generally parallel to each other and extending in opposite directions, and webbing interconnecting all of the side walls together adjacent one end thereof, the remaining portions of the side walls being free for independent flexing of each side wall.

2. A weatherstrip for a sliding window, said weatherstrip being fabricated from an organic polymeric material and having a cross-sectional contour comprising an outer channel and an inner channel, the weatherstrip being receivable in a window frame channel, the outer channel having outwardly angled flexible side wall portions which, at their widest spacing, are further apart than the intended window frame channel for pressure contact thereof with the interior wall surfaces of the window frame channel, the inner channel having inwardly angled side wall portions for substantially leak-free contact with a slidable window sash, the free ends of the inwardly and outwardly angled resilient side wall portions being generally parallel to each other and extending in opposite directions, and webbing interconnecting all of the side walls together adjacent one end thereof, the remaining portions of the side walls being free for independent flexing of each side wall.

3. A weatherstrip for a sliding window, said weatherstrip being fabricated from an organic polymeric material and having a cross-sectional contour comprising an outer channel and an inner channel, the outer channel having outwardly angled resilient side wall portions which are flexible for pressure contact with the interior wall surfaces of a window frame channel, the inner channel being for reception of a window sash, said inner channel having inwardly angled side wall portions which at their widest spacing are closer together than the thickness of the intended window sash for substantially leak-free sliding contact with the window sash, the free ends of the inwardly and outwardly angled resilient side wall portions being generally parallel to each other and extending in opposite directions, and webbing interconnecting all of the side walls together adjacent one end thereof, the remaining portions of the side walls being free for independent flexing of each side wall.

4. A weatherstrip for a sliding window, said weatherstrip being fabricated from an organic polymeric material and having a cross-sectional contour comprising an outer channel and an inner channel, the outer channel having outwardly angled resilient side wall portions which are flexible for pressure contact with the interior wall surfaces of a window frame channel, the inner channel having inwardly angled side wall portions for substantially leak-free contact with the slidable window sash, the free ends of the inwardly and outwardly angled resilient side wall portions being generally parallel to each other and extending in opposite directions, and webbing interconnecting the innermost portions of all of the side walls whereby said side wall portions of the inner channel are separate from the outermost portions of the side walls of the outer channel to permit independent flexing of said side wall portions of the inner channel.

5. A weatherstrip for a sliding window, said weatherstrip being fabricated from an organic polymeric material and having a cross-sectional contour comprising an outer channel and an inner channel, the outer channel having resilient side walls for reception within a window frame channel, the inner channel having resilient side walls for reception of a slidable window sash, the free ends of the inwardly and outwardly angled resilient side walls being generally parallel to each other and extending in opposite directions, and webbing interconnecting the innermost portions of all of the side walls whereby the side walls of the inner channel are separate from the side walls of the outer channel to permit independent flexing of the inner channel side walls during sliding of a window sash.

6. A weatherstrip for a sliding window, said weatherstrip being fabricated from an organic polymeric material and having a cross-sectional contour comprising an outer channel and an inner channel, the outer channel having outwardly angled resilient side wall portions which are flexible for pressure contact with the interior wall surfaces of a window frame channel, the inner channel having a pair of resilient side wall portions with the outer portions thereof being reversely turned and angled towards each other for substantially leak-free contact with a slidable window sash, the free ends of the inwardly and outwardly angled resilient side wall portions being generally parallel to each other and extending in opposite directions, and webbing interconnecting all of the side walls together adjacent one end thereof, the remaining portions of the side walls being free for independent flexing of each side wall.

7. A weatherstrip for a sliding window, said weatherstrip being fabricated from an organic polymeric material and having a cross-sectional contour comprising an outer channel and an inner channel, the outer channel having outwardly angled resilient side wall portions which are flexible for pressure contact with the interior wall surfaces of a window frame channel, the inner channel having inwardly angled flexible side wall portions with a longitudinal extending rib structure on the opposing surfaces thereof for substantially leak-free contact with a slidable window sash, the free ends of the inwardly and outwardly angled resilient side wall portions being generally parallel to each other and extending in opposite directions, and webbing interconnecting all of the side walls together adjacent one end thereof, the remaining portions of the side walls being free for independent flexing of each side wall.

8. A weatherstrip for a sliding window, said weatherstrip being fabricated from an organic polymeric material and having a cross-sectional contour comprising an outer channel and an inner channel, the outer channel having outwardly angled resilient side wall portions which are flexible for pressure contact with the interior wall surfaces of a window frame channel, the inner channel comprising a pair of flexible side walls, the outer portions of said inner channel side walls being reversely turned and angled towards each other, a longitudinal extending rib structure on the opposing surfaces of said reversely turned portions for substantially leak-free contact with a slidable window sash, the free ends of the inwardly and outwardly angled resilient side wall portions being generally parallel to each other and extending in opposite directions, and webbing interconnecting all of the side walls together adjacent one end thereof, the remaining portions of the side walls being free for independent flexing of each side wall.

9. A weatherstrip for a sliding window, said weatherstrip being fabricated from an organic polymeric material and having a cross-sectional contour comprising a web, a pair of outer resilient side walls extending from the outer side portions of the web to form an outer channel, a pair of inner resilient side walls extending outwardly from the web and being positioned within the outer side walls to form an inner channel, all of said walls being independently flexible, the outer channel side walls having portions angled away from each other which are flexible for pressure contact with the interior wall surfaces of a window frame channel, the inner channel side walls having inwardly angled portions for substantially leak-free contact with a slidable window sash, the free ends of the inwardly and outwardly angled resilient side wall portions being generally parallel to each other and extending in opposite directions.

10. A window construction comprising a frame having a channel-shaped cross-sectional contour, an inwardly projecting stop on the outer edge of each side wall of the frame, a weatherstrip in the frame channel, said weatherstrip being fabricated from an organic polymeric material and having a cross-sectional contour comprising an outer channel and an inner channel, the outer channel having outwardly angled flexible side wall portions in pressure contact with the interior side wall surfaces of the window frame channel, the outer edges of said weatherstrip outer channel side wall portions being in abutting relationship with said frame stops to return the weatherstrip in place, a slidable window sash having edge portions received in said weatherstrip inner channel, the inner channel having inwardly angled side wall portions in substantially leak-free contact with the sash, and webbing interconnecting all of the side walls of the weatherstrip together adjacent one end thereof, the other edges of the side walls being free for independent flexing of each side wall, the free ends of the inwardly and outwardly angled resilient side wall portions being generally parallel to each other and extending in opposite directions..

11. A window construction comprising a frame having a channel-shaped cross-sectional contour, an inwardly projecting stop on the outer edge of each side wall of the frame, a weatherstrip in the frame channel, said weatherstrip being fabricated from an organic polymeric material and having a cross-sectional contour comprising an outer channel and an inner channel, the outer channel having outwardly angled flexible side wall portions in pressure contact with the interior side wall surfaces of the window frame channel, the outer edges of said weatherstrip outer channel side walls being in abutting relationship with said frame stops to retain the weatherstrip in place, a slidable window sash having edge portions received in said weatherstrip inner channel, said inner channel having inwardly angled side wall portions in substantially leak-free contact with the sash, the free ends of the inwardly and outwardly angled resilient side wall portions being generally parallel to each other and extending in opposite directions, webbing interconnecting the innermost portions of all of the weatherstrip side walls whereby said side wall portions of the weatherstrip inner channel are separate from the outermost portions of the side walls of the weatherstrip outer channel to permit independent flexing of said side wall portions of the inner channel.

12. A window construction comprising a frame having a channel-shaped cross-sectional contour, an inwardly projecting stop on the outer edge of each side wall of the frame, a weatherstrip in the frame channel, said weatherstrip being fabricated from an organic polymeric material and having a cross-sectional contour comprising an outer channel and an inner channel, the outer channel having outwardly angled flexible side wall portions in pressure contact with the interior side wall surfaces of the window frame channel, the outer edges of said weatherstrip outer channel side walls being in abutting relationship with said frame stops to retain the weatherstrip in place, a slidable window sash having edge portions received in said weatherstrip inner channel, the inner channel having a pair of flexible side walls with the outer portions thereof being reversely turned and angled toward each other in substantially leak-free contact with the sash, and webbing interconnecting all of the side walls of the weatherstrip together adjacent one end thereof, the other edges of the side walls being free for independent flexing of each side wall, the free ends of the inwardly and outwardly angled resilient side wall portions being generally parallel to each other and extending in opposite directions.

13. A window construction comprising a frame having a channel-shaped cross-sectional contour, an inwardly projecting stop on the outer edge of each side wall of the frame, a weatherstrip in the frame channel, said weatherstrip being fabricated from an organic polymeric material and having a cross-sectional contour comprising an outer channel and an inner channel, the outer channel having outwardly angled flexible side wall portions in pressure contact with the interior side wall surfaces of the window frame channel, the outer edges of said weatherstrip outer channel side walls being in abutting relationship with said frame stops to retain the weatherstrip in place, a slidable window sash having edge portions received in said weatherstrip inner channel, the inner channel having inwardly angled flexible side wall portions with a longitudinally extending rib structure on the opposing surfaces thereof in substantially leak-free contact with the sash, the free ends of the inwardly and outwardly angled resilient side wall portions being generally parallel to each other and extending in opposite directions, and webbing interconnecting all of the side walls of the weatherstrip together adjacent one end thereof, the other edges of the side walls being free for independent flexing of each side wall.

References Cited by the Examiner
UNITED STATES PATENTS

| | | | |
|---|---|---|---|
| 1,903,225 | 3/1933 | Palenske | 20—56.4 |
| 2,569,955 | 10/1951 | Schassenberger | 20—56.4 |
| 3,018,525 | 1/1961 | Deisenroth | 20—52 |

FOREIGN PATENTS

| | | |
|---|---|---|
| 894,367 | 4/1962 | Great Britain. |
| 942,577 | 11/1963 | Great Britain. |
| 259,999 | 7/1949 | Switzerland. |

HARRISON R. MOSELEY, *Primary Examiner.*

A. I. BREIER, *Assistant Examiner.*